(No Model.)

H. C. JEWELL.
MANUFACTURE OF ARTIFICIAL STONE AND MARBLE.

No. 259,863.  Patented June 20, 1882.

Witnesses,
Edwin L. Jewell.
H. Aubrey Toulmin.

Inventor.
Henry C. Jewell,
By C. M. Alexander,
Attorney.

UNITED STATES PATENT OFFICE.

HENRY C. JEWELL, OF GEORGETOWN, DISTRICT OF COLUMBIA.

MANUFACTURE OF ARTIFICIAL STONE AND MARBLE.

SPECIFICATION forming part of Letters Patent No. 259,863, dated June 20, 1882.

Application filed April 26, 1882. (No model.)

*To all whom it may concern:*

Be it known that I, HENRY C. JEWELL, of Georgetown, in the District of Columbia, have invented certain new and useful Improvements in Artificial Stone and Marble; and I do hereby declare that the following is a full, clear, and exact description thereof, reference being had to the accompanying drawings, and to the letters of reference marked thereon, making a part of this specification.

Figure 1:
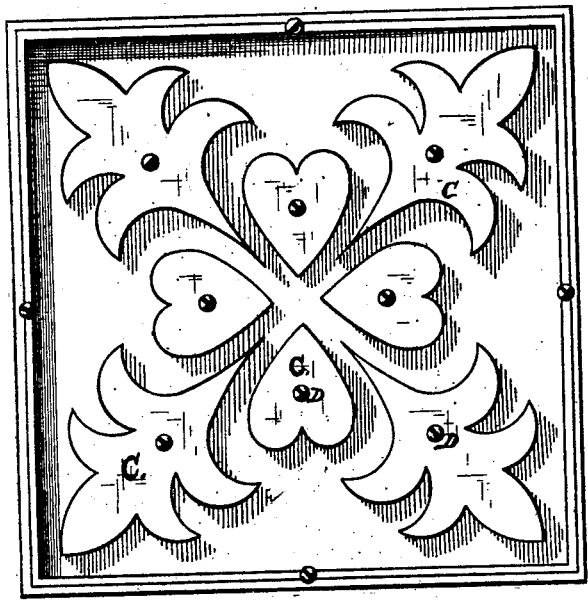
Figure 2:
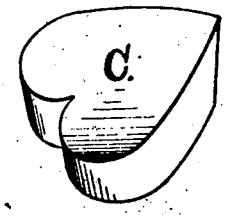

Figure 1 is a plan view, showing the blocks in position. Fig. 2 is a perspective view of a block detached.

This invention has for its objects, first, the production of an artificial stone or marble that will be impenetrable to moisture; secondly, the providing of a compound by means of which the ordinary artificial stones or porous natural stones may be rendered impenetrable to moisture; thirdly, the providing an improved method of inlaying pavements composed of artificial stone, marble, or the like, and of inlaying artificial marble, as more fully hereinafter described.

The accompanying perspective and plain drawings illustrate the method I employ for inlaying pavements and marble.

I employ as a base for my improved artificial stone and marble hydraulic cement, Roman cement, lime of Tiel, hydraulic lime, or plaster-of-paris, using the dark cements for stone and the white cements, &c., for marble; and in preparing the composition for my improved stone I take hydraulic cement, as above mentioned, and mix it with silicious sand and gravel in proportions to suit the conditions of the work required. For instance, for foundations or work of a similar nature, I use about fourteen parts of gravel, varying in size from that of a pea upward, and one part of sharp silicious sand and one part of cement. I do not propose, however, to limit myself to any exact proportions of cement and sand or gravel, as the proportions may be varied indefinitely without departing from the spirit of my invention. As a general rule, the requisite quantity of cement must depend altogether upon the nature of the work intended and upon the size of the stone to be made, small stones requiring more cement than large ones. After the sand, gravel, and cement have been thoroughly intermingled I dampen the same with water holding in solution the deutosulphate of copper, thus forming a plastic or semi-plastic mass, and tamp the same into molds or forms for the shaping of a block or series of blocks, and allow it to set or harden.

The deutosulphate of copper I employ generally in the proportion of one pound to seventy-five (75) gallons of water, although the proportions may be varied to suit the work required. My object in using the deutosulphate of copper is to decompose the alkali in the cement, and thus prevent efflorescence in the finished stone, which has proved a serious objection to all artificial stone heretofore made having hydraulic cement as a base, the efflorescing alkali impairing the color of the stone and disfiguring it.

After the stone has been formed and has become set and sufficiently hard I saturate it with a solution compounded from the following ingredients, viz: alum ammonia ferri, one pound; borate of soda, two pounds; nitrate of potash, three pounds; carbolic acid, one pint; muriate of ammonia, three pounds; nitrate of ammonia, one-half pound; oxalic acid, two pounds; lime-water, two quarts; dissolve in a sufficient quantity of water to make a saturated solution. When the blocks are made independently this compound may be employed as a bath, in which such blocks may be immersed until thoroughly saturated, and then afterward removed and dried; but when the stone composition is laid in a mass the compound may be applied as a coating in any suitable manner, so as to fill all the pores and render the stone impenetrable to moisture. This operation of dampening or coating the stone with the compound is repeated for three or four days, and until the stone is throughly saturated and coated. The compound, when thus placed upon the surface of the stone, expels and takes the place of the moisture in the mass, forcing it downward and out of the same, causing it to harden almost instantly, and obviating the delay consequent upon the evaporation of the water heretofore relied upon to finish the stone.

In manufacturing blocks of stone requiring a high degree of finish or otherwise the inner portions of the same may be formed of coarse heavy gravel, with about one-fifth of the quantity of cement that the outer surfaces require.

In the preparation of ornamental pavements and in inlaying marble, I make use of a series of solid blocks composed of wood, metal, glass, or other suitable material, and of such design as may be required, as indicated by the letter C. These are beveled at their edges, so as to draw freely from the mass, and are provided with points D, by means of which they may be secured to the bottom of the mold. The main body of the compound is filled in around these blocks, and after it has sufficiently hardened the blocks are removed and the spaces filled in with the compound, differently colored, and the whole is allowed to set, forming a heterogeneous ornamented mass; or the compound may be laid in mass, with a block of wood or other material in the center, and parallel, circular, oval, or rectilineal lines cut through it by means of a tool similar to a beam-compass, which is pivoted to the center block and carried around it in a circle, or by any other convenient method. The spaces between the cuts are then removed and filled with the compound, differently colored.

The superiority of a solid block over the forms now sometimes used, made of strips of sheet tin or iron, is obvious, as it remains solid while the base of the pavement or marble is being filled in and leveled off, while the latter are apt to lose their shape by being forced in by pressure of the material when being tamped into the molds or forms.

In the manufacture of marble I use a larger proportion of cement and substitute fine marble-dust for sand. I reduce the mass to a plastic or semi-plastic state by the addition of the deutosulphate-of-copper solution above described to each fifty (50) gallons, of which, however, I add two (2) quarts of liquid fish-glue, and the mass is then formed into slabs, and allowed to dry, and cured and rendered impenetrable to moisture by the use of the saturated solution heretofore described.

Having thus described my invention, what I claim as new, and desire to secure by Letters Patent, is—

1. The compound artificial stone or marble herein specified, composed of hydraulic cement, Roman cement, lime of Tiel, hydraulic lime, plaster-of-paris, and sand or marble-dust, and deutosulphate of copper, in about the proportions specified.

2. The solution or bath for the manufacture of artificial stone, composed of alum ammonia ferri, borate of soda, nitrate of potash, carbolic acid, muriate of ammonia, nitrate of ammonia, oxalic acid, and lime-water, in about the proportions set forth.

3. The method of inlaying artificial marble slabs and stone pavements by means of solid blocks of metal, wood, glass, or other suitable material, formed in any desired designs, to be employed substantially as specified.

In testimony whereof I affix my signature, in presence of two witnesses, this 25th day of April, 1882.

HENRY C. JEWELL.

Witnesses:
CHAS. L. COOMBS,
EDWIN L. JEWELL.